United States Patent
Sik et al.

(10) Patent No.: US 9,465,803 B2
(45) Date of Patent: Oct. 11, 2016

(54) SCREEN SHARING PRESENTATION SYSTEM

(75) Inventors: Stefan Sik, Stockholm (SE); Bret Beresford-Wood, Lafayette, CA (US); Julia Sears, Shelton, CT (US)

(73) Assignee: NASDAQ TECHNOLOGY AB, Stockholm (SE)

( * ) Notice: Subject to any disclaimer, the term of this patent is extended or adjusted under 35 U.S.C. 154(b) by 273 days.

(21) Appl. No.: 13/613,397

(22) Filed: Sep. 13, 2012

(65) Prior Publication Data
US 2013/0073965 A1 Mar. 21, 2013

Related U.S. Application Data

(60) Provisional application No. 61/535,518, filed on Sep. 16, 2011.

(51) Int. Cl.
*G06F 17/30* (2006.01)
*G06F 17/24* (2006.01)

(52) U.S. Cl.
CPC ....... *G06F 17/30056* (2013.01); *G06F 17/241* (2013.01)

(58) Field of Classification Search
CPC .............. G06F 3/0481; G06F 17/241; G06F 17/30056; H04N 5/74; G06Q 10/10; G11B 27/105
USPC ................ 715/730, 761, 731, 732, 756, 753
See application file for complete search history.

(56) References Cited

U.S. PATENT DOCUMENTS

| | | | |
|---|---|---|---|
| 5,581,702 A * | 12/1996 | McArdle et al. | 709/204 |
| 7,046,134 B2 * | 5/2006 | Hansen | 340/506 |
| 7,328,258 B2 * | 2/2008 | Koide et al. | 709/223 |
| 7,373,590 B2 * | 5/2008 | Woolf | G06F 17/242 715/230 |
| 7,552,228 B2 * | 6/2009 | Parasnis et al. | 709/231 |
| 7,640,502 B2 * | 12/2009 | Xu et al. | 715/730 |
| 7,661,101 B2 * | 2/2010 | Chadzynski | 717/164 |
| 7,733,366 B2 * | 6/2010 | Beavers et al. | 348/14.08 |
| 7,747,953 B2 * | 6/2010 | Saavedra | 715/730 |
| 2005/0240428 A1 * | 10/2005 | Gabrick et al. | 705/1 |
| 2006/0041687 A1 * | 2/2006 | Caspi et al. | 709/248 |
| 2006/0167996 A1 * | 7/2006 | Orsolini et al. | 709/204 |
| 2006/0235927 A1 * | 10/2006 | Bhakta et al. | 709/204 |
| 2007/0226606 A1 * | 9/2007 | Noyes et al. | 715/512 |
| 2008/0065996 A1 * | 3/2008 | Noel et al. | 715/753 |
| 2009/0265487 A1 * | 10/2009 | Zhang et al. | 710/61 |
| 2010/0037151 A1 * | 2/2010 | Ackerman et al. | 715/753 |
| 2010/0257449 A1 * | 10/2010 | Lieb et al. | 715/730 |

OTHER PUBLICATIONS

U.S. Appl. No. 13/543,564, filed Jul. 6, 2012.
U.S. Appl. No. 13/543,617, filed Jul. 6, 2012.
U.S. Appl. No. 13/038,053, filed Mar. 1, 2011.

* cited by examiner

*Primary Examiner* — Li Sun
(74) *Attorney, Agent, or Firm* — Nixon & Vanderhye P.C.

(57) ABSTRACT

A screen sharing presentation system includes a presenter client system that leads a presentation and listener client systems that follow the presentation. A server facilitates communication between the presenter client system and the listener client systems. Users of the client systems may provide annotation information for the presentation. The annotation data is not visible to other users of other client systems, but is displayed on the respective user's personal views of the presentation. The presenter client system and the listener client systems are synchronized by communicating a current document location or other status indications.

18 Claims, 9 Drawing Sheets

KA Comprehensive Board Meeting

Page: 1 / 69

NASDAQ OMX

KA Comprehensive Board Meeting
Friday, 8/26/2011
3:00 - 5:00 PM CT

1. Executive Session of Board — Board Chair
2. Review of Minutes — Board Chair
   *Minutes Sample - Page 2*
3. Market Report — Chief Operating Officer
   *Market Trading Report - Page 46*
2. Review of Minutes — VP or HR
   *Personnel Updates - Page 47*
2. Review of Minutes — Chief Operations Officer
   *Ops and Administrative Matters - Page 64*
   *Financial Chart - Page 65*
2. Legal & Compliance — Chief Operations Officer
   *Compliance and Legal Report - Page 66*
2. Closing Remarks and Meeting Planning — Corporate Secretary
   *Closing - Page 67*

YOU ARE NOW PRESENTING MEETING 'KA COMPREHENSIVE BOARD MEETING'

PRESENTER MODE | ON    ATTENDEES 11 | VOTE 4 | EMAIL 0

AsuncionDemo NASDAQ OMX

Welcome: Elisabeth Andree Jouvry

JUL 28 — 12:00 AM-12:00 AM CT
Board of Directors Meeting (EBW)
MEETING | BOOKS AVAILABLE

JUL 29 — 3:00 PM-5:00 PM CT
Annual Board Meeting (100MB)
MEETING | BOOKS AVAILABLE

AUG 06 — 3:00 PM-5:00 PM CT
Board of Directors Meeting...
MEETING | WAITING...

AUG 25 — 3:00 PM-5:00 PM PT
KA Audit Committee Meeting
MEETING | BOOKS AVAILABLE

AUG 26 — 3:00 PM-5:00 PM CT
KA Comprehensive Board Meeting
MEETING | DOWNLOADED

AUG 29 — 6:00 PM-9:00 PM PT
Executive Vice President Recepti...
EVENT | BOOKS NOT AVAILABLE Board of Directors Meeting...
AUG 06 2011 3:00PM - 5:00 PM CT
Location: Kaknastomet
Map: Directions
Details: Board of Directors Meeting Meeting Book | Exhibit Book | Attendees
Meeting Book
*Published: 8/2/11 12:28 PM (PDT)*
⊙ DOWNLOAD BOOK
WAITING...

TOUCH TO GO TO ACTIVE MEETING 'KA COMPREHENSIVE BOARD MEETING' PRESENTED BY 'ELISABETH ANDREE JOUVRY'

PRESENTER MODE | CHANGE BOARDS | CONTACTS 54 | DOCUMENTS 5 | VOTE 4 | EMAIL 0

400
402
404

Boardmeeting Document 1.0　　　　　　　　　　Page: 3 / 69

Index

Introduction

SECTION 1: UNMODIFIED AUDITROR'S REPORTS ON FINANCIAL STATEMENTS

| | Page |
|---|---|
| Example 1 - Auditor's report on individual company financial Statements. | 4 |
| | 6 |
| Example 2 - Auditor's report on individual company financial Statements with the exemptions under PASE Availed of. | 8 |
| Example 3 - Auditor's report on individual company financial Statements. Financial Statements contain surround information other than directors' report | 11 |
| Example 4 - Auditor's report on group and parent company Financial Statements. | 13 |
| Example 5 - Auditor's report on Abridged Financial Statements. | 16 |

FOLLOWING MEETING 'KA COMPREHENSIVE BOARD MEETING' PRESENTED BY 'ELISABETH ANDREE JOUVRY'

PRESENTER MODE | ON　　ATTENDEES 11　VOTE 4　EMAIL 0

FIG. 5

SCREEN SHARING PRESENTATION SYSTEM

CROSS REFERENCE TO RELATED APPLICATIONS

This application claims priority to U.S. Provisional Application No. 61/535,518, filed Sep. 16, 2011, the entire contents of which are hereby incorporated by reference.

TECHNICAL OVERVIEW

The technology herein relates to presentation tools provided on computing systems. More particularly, the technology herein relates to mobile screen sharing presenter devices that share documents, or views of those documents, between the devices.

BACKGROUND

Giving a presentation is a powerful way to communicate a range of information to an audience. Presentations can vary from giving a product demonstration, for example Steve Jobs introducing the iPhone™, to conducting an online training session for remotely located users, to reviewing the latest quarterly report at a board of directors meeting. In such environments, visual elements can improve how information is communicated to attendees of the presentation. For example, a pie chart can quickly communicate how a company's revenue is generated (e.g., by division, product, etc).

One way to provide visual elements for a presentation is to use a computer application such as Microsoft PowerPoint™, in which a series of slides can be presented, or WebEx™ or Microsoft Live Meeting, which provide collaborative web conferencing capabilities. These types of programs allow the presenter to share visual elements of the presentation with the audience.

As an example, in a board meeting environment, a Chief Financial Officer (CFO) of a company may present a report regarding the company's financials. This report may be "shared" or displayed to other attending board members. During the presentation sections of the report are displayed in accordance with how the presenter presents the report.

Traditionally, sharing the presenter's display with the audience was accomplished by: 1) sharing a desktop or document; or 2) locating all of the attendees in the same room with a projection screen (or a video camera).

For the first case, a shared desktop or document may be accomplished by capturing an image (e.g., a bitmap) from the perspective of the presenter, compressing the captured image, and transmitting the compressed image to other attendees. However, this compression technique can require a large amount of network resources to effectively "share" the presentation with other users because multiple images per second may be needed to provide an acceptable picture to the remote users. Further, in certain cases, such network resources may not be available. For example, a board member may be "attending" a presentation and watching via a tablet device that is connected over a cellular connection (e.g., a 3G connection).

In the second case, locating everyone in the same room (or broadcasting the presentation with a video camera) can be effective in certain cases. However, in an ever increasing mobile world where users are located remotely from one another, such a setup is not always possible. Furthermore, when attendees are located within the same conference room, each person usually does not have their own view of the presentation. For certain attendees this can be problematic as traditional note taking with a pad of paper may be difficult because linking the notes to particular portions of a presentation at a later time is time consuming or difficult.

One way in which attendees address this problem is by printing out physical copies of the document and then making notes or annotations in the margins while the presenter gives the presentation. However, this type of solution may not be an arrangement is not always desirable or possible. For example, the discussed documents may be complex and lengthy. Also, creating physical copies of the documents or presentation for each person can be wasteful. Furthermore, the attendees in the presentation may not have the capability to create physical copies (e.g., because they are remotely located).

Moreover, in both of the above cases, there may be instances in which sharing exactly the same view of the presentation is undesirable. For example, a board member may want to study a particular chart in a document for longer than the presenter discusses the chart (e.g., longer than the presenter remains on that slide or page).

In view of these and other problems, there exists a need for technical improvements in the presentation technology art.

SUMMARY

An example screen sharing presentation system provides each one of a plurality of mobile devices (e.g., a smartphone, a tablet device like an iPad™) with a copy of a file, presentation, or document that is being presented by a presenter. Each user may provide annotations to their mobile device during the presentation. The annotations are associated with the personal copies. The respective copies are synchronized with the presenter's version of the presentation to keep the presenter and the attendees on the same page or view of the presentation.

In certain example embodiments, users can have annotation data (e.g., notes) displayed in the presentation while maintaining synchronization.

In certain example embodiments, users can optionally de-synchronize their view of the presentation from the presenter's view. For example, users can navigate away from a synchronized display of the presentation to multi-task (e.g., read e-mail or look at other documents) on their mobile device (e.g., iPad™). These users may then re-join and re-synchronize with the presentation at a later date.

In certain example embodiments, synchronization between the view of the presenter and the view provided by attendees is provided without sending compressed images between the mobile devices. This may result in little or no loss in image quality between the view shown to the presenter and the view shown to each attending user. In certain instances, a document location is passed between mobile devices to keep the presenter's view the same (or substantially similar to) the attendee's view of the presentation, resulting in decreased bandwidth needed to maintain synchronization between the client devices versus certain image compression techniques.

In certain example embodiments, one mobile client device takes on the role of a presenter of a presentation (a presenter client device). Other mobile client device may then join or subscribe to an initiated presentation (listener client device). Accordingly, when the presenter adjusts his/her view of the presentation (e.g., by moving to the next slide or next page), the changes are propagated to the listener client devices.

Certain example embodiments may relate to a "Directors Desk Presenter Mode," which gives board members and executives a way to synchronize board presentations. This provides functionality to keep everyone on the same page at all times, while preserving an individual user's private notes or annotations. As one example application, presenter mode may be used by companies in the boardroom to conduct regularly scheduled board meetings, committee meetings, or even ad-hoc meetings that require directors and executives to meet virtually or in person.

Certain figures and/or descriptions herein may relate to Nasdaq OMX's Board as a non-limiting example in the context of an online version of "Directors Desk," (see U.S. patent application Ser. No. 13/038,053, filed Mar. 1, 2011, the disclosure of which is incorporated herein by reference), where each board member uses an iPad as an example client device. In this example, the Board can download an iPad Application and take advantage of Presenter Mode during meetings.

In certain example embodiments, a screen sharing presentation system is provided. The system includes a plurality of client devices and a presentation controller system. The plurality of client devices includes a presenter client device and at least one mobile listener client device. Each one of the plurality of client devices includes a display and a processing system configured to output images in accordance with a selected presentation to the display. The presentation controller system is configured to communicate with each one of the plurality of client devices via a computer network and includes at least one processor. The processing system of the presenter client device outputs a presenter version of the selected presentation to the display of the presenter client device in accordance with received presenter user input commands. The processing system of the presenter client device communicates a synchronization update status indicator to the presentation controller system, the synchronization update status indicator is associated with how the presenter version is output to the display of the presenter client device. The at least one processor of the presentation controller system receives the synchronization update status indicator and transmits it to the at least one mobile listener client system. The processing system of the at least one mobile listener client device receives and loads a local version of the selected presentation. The synchronization update status indicator is received from the presentation controller system and user-specific annotation data is loaded that is associated with the local version of the selected presentation. The processing system outputs, to the display, the local version of the selected presentation including the user specific annotation data. Synchronization is maintained, in accordance with the synchronization update status indicator, between the output annotated local version of the selected presentation and the output presenter version of selected presentation.

In certain example embodiments, a method of displaying a selected presentation on a plurality of mobile client systems is provided where the plurality of mobile client systems includes a presenter client leading the selected presentation and a plurality of listener client systems following the selected presentation. A communication is received that the presenter client system is the leader of the selected presentation. The selected presentation is recorded as being available to be joined. Join requests are received from the plurality of listener client systems to follow the selected presentation. Identification information is stored, to a non-transitory storage medium system, that identifies the plurality of listener client system joined to the selected presentation, each one of the plurality of listener client systems set to load a local version of the selected presentation for display thereon. A synchronization update indication is received from the presenter client system that corresponds to a displayed view of the selected presentation on the presenter client system has changed. The synchronization update indication is transmitted to each one of the plurality of listener client systems based on the stored identification information, each one of the plurality of listener client systems set to update respective local displayed views of local versions of the selected presentation in accordance with the transmitted synchronization update indication.

In certain example embodiments, a non-transitory computer readable storage medium storing computer readable instructions for use with a presentation computing system is provided. The mobile presentation computing system includes a processing system with at least one processor, at least one use input control, and a transceiver that is configured to communicate over a computer network with at least a presentation controller system. The stored instructions include instructions to transmit a request, to the presentation controller system, to join as a follower of a selected presentation that is being led by a presenter on a presenter client system. Presentation synchronization information is received and user-specific annotation data is loaded that is associated with a personal version of the selected presentation. The instructions include instructions to output, to a display device that is associated with the mobile presentation computing system, the personal version of the selection presentation including the user-specific annotation data. The instructions also include instructions to maintain synchronization, in accordance with the presentation synchronization information, between the output annotated personal version of the selected presentation and a presenter version of selected presentation processed on the presenter client system.

In certain example embodiments, a mobile computing presentation viewing apparatus is provided. The mobile computing presentation viewing apparatus includes a transceiver that is configured to receive information regarding a selected presentation being led from another computing apparatus (e.g., a presenter computing apparatus) where another user is set to provide commands to adjust how a presenter version of the selected presentation is displayed on the presentation computing apparatus. The mobile computing presentation viewing apparatus also includes a non-transitory storage medium that is configured to store a personal version of the selected presentation. A display is also included that is configured to show a display view of the personal version of the selected presentation. A user input device is included that is configured to receive input from a user. The mobile computing presentation viewing apparatus further includes a processing system configured to receive, via the user input device, user input to follow the selected presentation being led from the presentation computing apparatus. The processing system receives, via the transceiver, data that is associated with how the selected presentation is displayed on the presentation computing apparatus. The processing system also updates, via the display, the display view to a new display view of the personal version of the selected presentation in accordance with the received data.

The features described herein may be combined to form additional embodiments and sub-elements of certain embodiments may form yet further embodiments.

BRIEF DESCRIPTION OF THE DRAWINGS

These and other features and advantages will be better and more completely understood by referring to the following detailed description of example non-limiting illustrative embodiments in conjunction with the drawings of which:

FIG. 3 shows another view of a presenter mode starting a shared presentation on a presentation device;

FIG. 4 shows a view of a presentation viewing mode on a listener device;

FIG. 5 shows a view from a listener device of a presentation;

DETAILED DESCRIPTION

Figure 1:
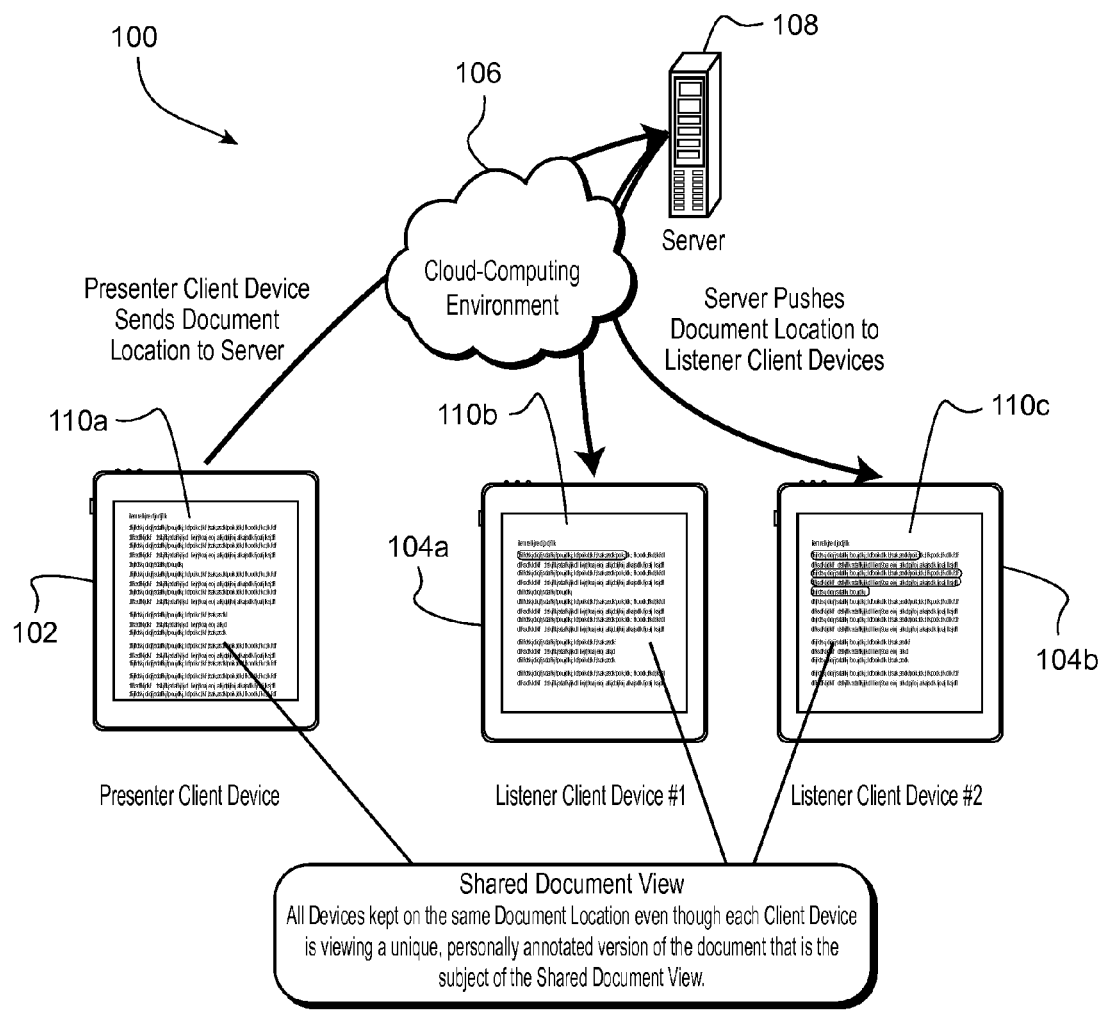
FIG. 1 depicts an example of a shared presentation system according to certain example embodiments.

FIG. 1 depicts an example of a shared presentation system according to certain example embodiments. In this example, a mobile screen presentation system 100 uses a client-server architecture to push a shared document view of a given presentation. As described in greater detail below, a shared view is related to the presenter of the presentation "sharing" their view of the document or presentation with other users.

In this non-limiting example, each mobile device 102, 104a, and 104b is a mobile screen presentation device such as a tablet computing device (e.g., an iPad™, iPhone™, Android, laptop, etc) or other mobile computing device. It will be appreciated that other types of computing devices or computing resources may be used. Such devices or resources may be may be mobile and/or stationary. For example, personal computers may be used as client devices. In certain example embodiments, one client device (e.g., the device "presenting" the presentation) is a personal computer, while other client devices (e.g., devices "listening" to the presentation) are mobile devices.

In any event, while devices 102, 104a, and 104b serve as client devices, another computing device (e.g., a cloud-hosted web service application 106) acts as a server 108 to facilitate communication over a computer network between the client devices. It will be appreciated that while certain example embodiments use a "server" to provide communication between the client devices, other embodiments may not use a dedicated server. For example, the presenter client device 102 may also act as a server (e.g., server 108) and push updates to other connected client devices (e.g., 104a, 104b). In other words, certain example embodiments may use peer-to-peer technologies to provide communication between client devices in absence of a dedicated server 108.

In the example of FIG. 1 there are two types of client devices. The first is a presenter client device 102 which initiates a presentation and takes on a presenter role. The second type of client device is a listener client device, which includes listener devices 104a, 104b. Specifically, other client devices can join the initiated presentation started by presenter client device 102 and take on a listener role. Once connected, listener client devices 104a, 104b "follow" the presenter client device 102.

As a result of listener client devices 104a and 104b following the presenter device 102, when the user controlling the presenter client device 102 changes the page of the document 110a in the presentation, each listener client device 104a, 104b changes the page (e.g., view) that is displayed in near real-time to match the display on the presenter client device 102. In other words, if the presenter is on page 30 of a presentation, the listener client devices following the presentation are automatically synchronized to page 30.

Coordination in synchronizing the presenter client device 102 with the listener client devices 104a, 104b may be accomplished by sending a unique document location value from the presenter device 102 to the server 108. The server may be hosted in a high-speed cloud-computing environment 106, which relays the document location to all listener client devices 104a, 104b. The document location is then used to enable the listener client devices 104a and 104b to stay (or become) synchronized with the page 110a being displayed on the presenter client device 102. Thus, listener client devices 104a and 104 may display views or versions of the presentation as images 110b and 110c, respectively.

However, the view of the given presentation may still be slightly different between the individual client devices. Specifically, users of the listener client devices 104a and 104b may have/provide user specific annotations for their displayed version of the presentation. These annotations may then be displayed on the respective listener client devices 104a and 104b while the presentation is kept synchronized with the presenter client device 102. For example, the user of listener client device 104a may annotate the presentation that is displayed on his device by highlighting a paragraph of a page in the presentation. This highlighting is then stored such that when the appropriate page of the presentation is displayed, the highlighting automatically appears. However, as the annotation information is tied to a specific user, device, or version of the document, the same annotation information is not displayed on other client devices (e.g., 102 or 104b).

In certain example embodiments, users may optionally leave or de-synchronize from a presentation and then return and re-synchronize at a later time. De-synchronized users can perform other tasks such as checking email or reviewing other sections of the presentation. For example, a user of a listener client device 104a and 104b may de-synchronize in order to study a particular page or slide in the presentation for longer than the presenter discussed the same item.

The presentation displayed on the presenter client device 102 may also be ended at any time by the presenter. This may cause a subsequent notification to be sent (e.g., via server 108) to all listener client devices (e.g., 104a and 104b) that the presentation or sharing of a document view has ended.

Figure 2:
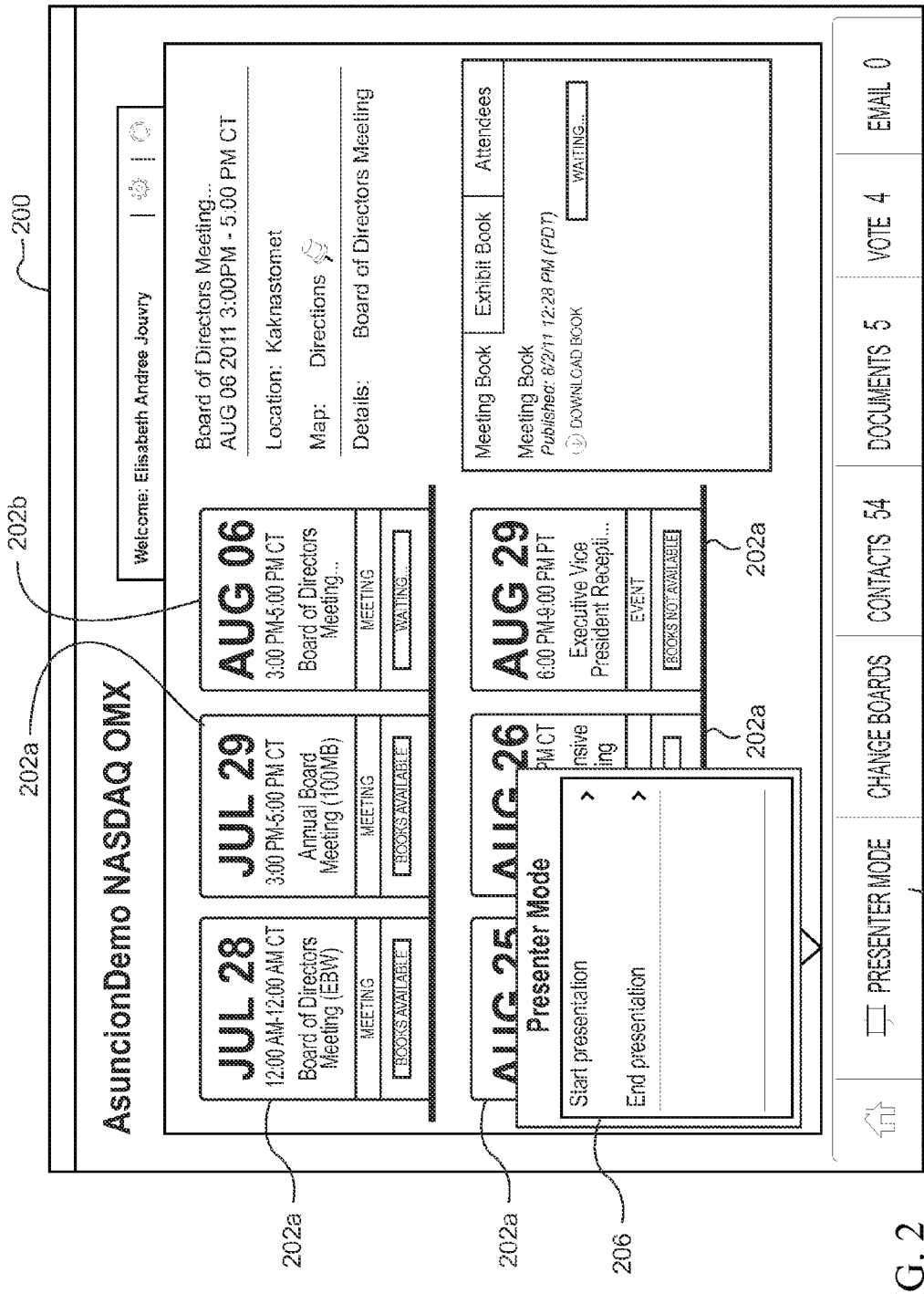
FIG. 2 shows a view of a presenter mode of a shared presentation device.
Figure 6:
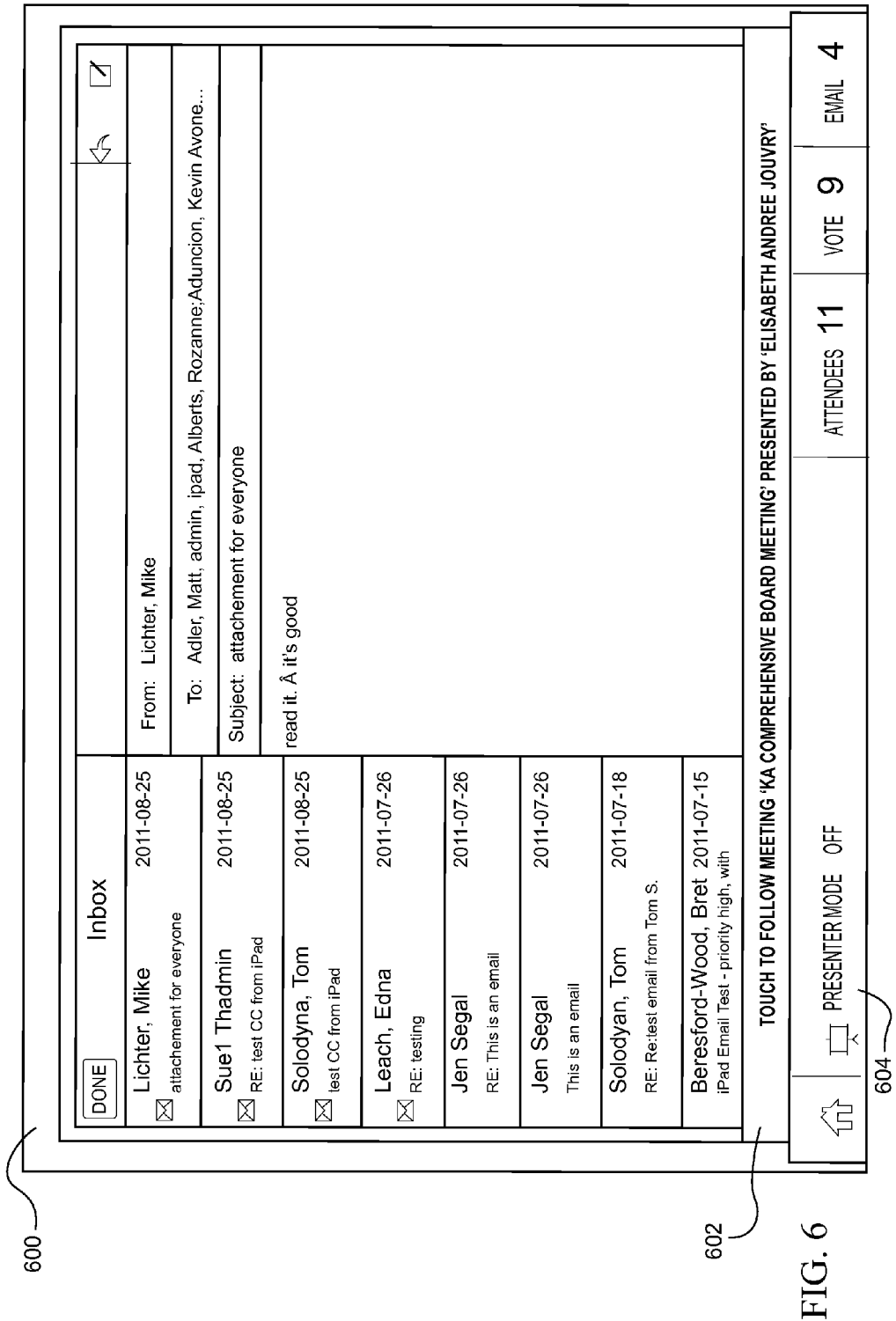
FIG. 6 shows a view of a screen on a listener device navigated away from the presentation.

FIGS. 2-6 show user interface elements and/or displays associated with certain aspects of example client devices in a mobile screen sharing presentation system. FIGS. 2 and 3 show user interface elements for an example presenter client device and FIGS. 4-6 show user interface elements for an example listener client device. In certain instances, a client device may be configured to be a listener and a presenter (e.g., the same client may "listen" to one presentation and present another presentation or a different portion of a presentation).

FIG. 2 shows a view 200 of a presenter mode of a presenter client device. Specifically, a presenter can select one of the available presentations 202a or 202b (referred to as meetings in this example).

The listing of available presentations may be displayed for only presentations that the user has access to (e.g., based on authorization rules associated with the user's login credentials that determine the available presentations). In certain example embodiments, some presentations may only be available for "listening," while others may be available for the user to "present."

Available presentations may include different types of presentations. For example, in some instances the presentation may be an event (e.g., the introduction of a new product) in other instances the presentation may be for a meeting.

In certain example embodiments, users with client devices (e.g., presenter and/or listener client devices) may be required to authenticate with the server 108 (or associated computing service). Such authentication may rely upon username/password, deviceIDs such as a MAC address, two-factor authentication techniques, combinations thereof, and/or any other form of suitable authentication.

In any event, the user of a presenter client device may select presentation 202b and switch into "Presenter Mode" by clicking the "Presenter Mode" button 204 in the main toolbar of the application (or app). The presenter can then choose to start the presentation and become the presenter/leader for that presentation.

In certain example embodiments, the shown presentations 202a and 202b are automatically downloaded to the user's client device when initially displayed in the selection screen 200. In certain example embodiments, only the summaries of the presentations are initially downloaded and displayed on the user's device. Further, when a user selects one of the presentations, a version of the presentation for the presenter's device is downloaded (e.g., a presenter version).

FIG. 3 shows another view 300 of a presenter mode starting a shared presentation on a presentation device. After clicking "start presentation" in the dialog box 206 of FIG. 2 and then selecting meeting 202b, the presenter's client device automatically opens the "Meeting Book" to begin the selected presentation in the shared document view 304. The display of the presentation can include a user interface element 302 that identifies the device as being the "presenter" for this presentation.

Once the "Presenter Mode" starts for a particular meeting/presentation and the "Meeting Book" opens for that meeting, the client mobile device of the presenter communicates to a server (e.g., 108) that the device is now a presenter client device 102 for that meeting/presentation. In response to this notification, the server "pushes" the presenter information to other mobile client devices. In certain example embodiments, other client devices may be client devices that are currently logged into that same company account. Thus, users are allowed to join the presentation by clicking a special "presenter mode" tool bar explained below.

FIG. 4 shows a view 400 of a presentation viewing mode on a listener client device. In certain example embodiments, this view may be similar to that shown in FIG. 2. Indeed, the view shown in FIGS. 2 and 4 may be used to either join available presentations or initiate presentations via, for example, the presenter mode 404 button.

The server pushes the details of the ongoing presentation to all listener client devices (or only some of the listener client device), those users are presented with a special presenter mode toolbar 402, which reads "TOUCH TO GO TO ACTIVE MEETING . . . ." Once the listener clicks on that bar, the mobile device communicates to the server that it is now an active listener client device for the given meeting, and the selected meeting book/presentation is opened automatically on the client device to be viewed by the user.

In certain example embodiments, meeting books/presentations may be downloaded on request (e.g., when a user joins the presentation), may be downloaded when the presentation or documentation is provided to the server (e.g., the data regarding the presentation is "pushed" to every client device), or may be streamed to the listener client device in accordance with a join request for an active presentation. As used in this context, streamed may mean that only portions, instead of the whole, of a presentation are downloaded while the presentation is being presented. Thus, presentations may be stored locally on a mobile client device or may be streamed from a server system.

FIG. 5 shows a view 500 of a presentation presented on a listener client device. The listener client device opens the locally stored copy of the meeting book and displays the view 500 of the active presentation. In certain example embodiments, after opening the presentation for the first time, it will be automatically synchronized with the presenter client device. Specifically, if a listener device joins midway through the presentation, the listener device will automatically display the page of presentation that the presenter is discussing. Further, once opened, the display may include a notification 502 that the user is "following" the presentation.

As discussed above, there may be circumstances where it is not always desirable for a user to strictly follow the presenter's view of the presentation/meeting. Accordingly, a user may click the presenter mode button 504 to "OFF" to de-synchronize from a joined presentation. This may then act to prevent updates from the presenter from being reflected on the listener client device. Thus, a user may browse ahead or back in the meeting that is stored locally, add notes to the presentation, or perform other tasks such as checking email as shown in FIG. 6.

The user of the listener device may also see and/or make annotations or notes to the presentation that is being displayed. For example, the meeting book shown in view 500 may have an annotation 506 in the form of the highlighted "Example 2" portion of the presentation.

Annotations may be provided through an input device such as a touch screen, keyboard, mouse, microphone, or the like. For example, the highlighted annotation 506 may be input by the user drawing on the touch enabled screen of the mobile client device. In certain example embodiments, annotation information may be input and stored by users other than the viewing user. For example, an assistant or technical expert may provide annotations on a particular portion or a presentation. When the presentation is presented these notes may be displayed to the viewing user of the client device.

In certain example embodiments, the annotation information may then be saved in the local or personal version of the presentation. This storage may operate in a manner similar to storing marked up copies of text documents. In certain example embodiments, the annotation information may be stored separately from the personal version of the presentation. For example, the annotation data may be stored in a database. When the personalized version of the presentation is displayed on the client device of the user the annotation data may be loaded and integrated with the presentation data for display on the client device.

In certain example embodiments, annotation data may be stored on a computing device that is separate from the mobile device. For example, a cloud based solution may be used (e.g., server 108 or cloud service 106). A database may be used to keep track of and associate personal annotation information with a presentation for each user.

When the user has the presenter mode turned "ON," the personalized version of the presentation displayed on the client device is set to automatically maintain synchronization with the presenter client device in real-time (or substantially thereof—e.g., less than a couple seconds of delay).

This may be accomplished by using a document location value that is passed between the presenter, server, and client listener devices. When the listener client device receives the document location the local version of the meeting book is displayed in accordance with that document location.

In certain example embodiments, the document location value that is passed between client devices may relate to the current page or slide number of the presentation. In certain example embodiments, the document location may include additional information regarding what portions of the presentation are being displayed or how the presentation is being displayed on the presenter client device. For example, a line number, a zoom percentage, a progress percentage or other values that may reflect how the presentation is being displayed on the presenter client device may be included in the document location information that is passed between client devices.

In addition to, or alternatively from, the document location information, other types of information may be sent to reflect what is displayed on the presenter device. For example, the commands or inputs used to advance (or otherwise change) the presentation on the presenter client device sent to the listener devices and processed thereon. In other words, if the presenter indicates a next page command, that command (or an indication thereof) may be sent to the listener devices. The listener devices may then re-implement the command (e.g., automatically) through software that is running on those devices.

FIG. 6 shows a view 600 of a screen on a listener device navigated away from the presentation. As discussed above, the presenter mode also allows users to turn presenter mode "OFF" (e.g., temporarily) in order to perform other tasks. When the user clicks on the presenter mode button 504 in FIG. 5 the locally displayed version of the presentation is de-synchronized from the updates pushed from the presenter.

De-synchronizing a listener client device may be accomplished by sending a notification to the server that the client device is no longer to receive updates or may be implemented by the listener client device simply ignoring incoming updates.

After de-synchronizing, the user can navigate to other portions of the presentation or perform other tasks on the client device. In FIG. 6, the user is shown checking their email. In this state, an indication of the status of the presenter mode is shown via button 604 to visually show that the presenter mode is now off. Also, a button 602 is displayed that provides a way for the user of the listener client device to navigate back to the presentation. Specifically, when a user clicks button 602 on the listener device, a re-synchronize command may be used to automatically turn the presenter mode back on and re-synchronize the local personal version with the presenter version of the presentation.

In certain example embodiments, users can also turn the presenter mode off to jump ahead or back in the document being presented or view different documents to cross-reference certain information. For example, if a presenter is going too fast through a presentation, the user of the listener device can disconnect and input some annotations for later review. As noted above, the listener simply clicks the presenter mode toolbar once again, where it states, "TOUCH TO FOLLOW MEETING . . . " in order to be taken right back to the meeting book being presented, on the same page the presenter is actively displaying.

Figure 7:
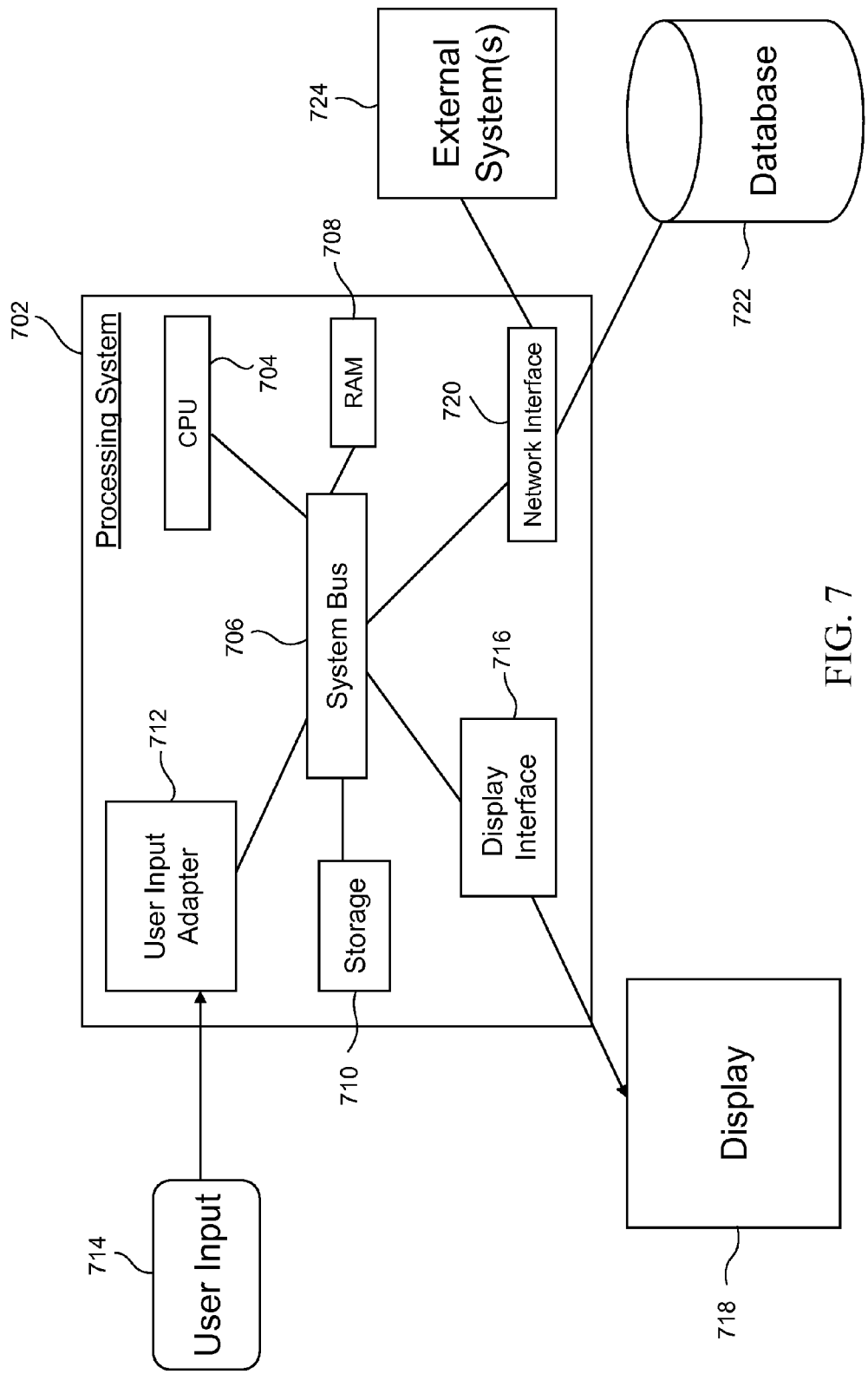
FIG. 7 is a block diagram of an exemplary computing system according to certain example embodiments.

FIG. 7 is a block diagram of an exemplary computing system according to certain example embodiments. A processing system 702 may include a central processing unit or CPU 704, a system bus 706 that communicates with RAM 708 and storage 710. The storage 710 can be magnetic, flash based (e.g., for a mobile client device), solid state, or other storage technology. The system bus 706 may also communicate with a user input adapter 712 (e.g., a PS/2 or USB interface) that allows users in input commands to the processing system via a user input device 714 (e.g., a keyboard, mouse, touch panel, or the like). The results of the processing may be displayed to a user on a display 718 (e.g., an LCD) via a display interface 716 (e.g., a video card or the like).

The processing system 702 may also include a network interface 720 (e.g., a transceiver) that may facilitate wired (e.g., Ethernet) or wireless communication (WiFi/802.11x protocols, cellular technology, and the like) with external systems 724 or databases 722. External systems 724 may include other processing systems, systems that provide third party services, etc. Here, external systems may also be the client devices or server systems. For example, the processing system 702 may implement functionality of a client device (e.g., where users review documents and a secure viewer is running) as described herein, thus the external system may be the server system (e.g., a VDR system) as described herein. Conversely, the processing system 702 may implement the server system and the external systems may include client devices. External systems may also include network attached storage (NAS) to hold large amounts of data (e.g., thousands or millions of electronic documents). Such external systems for storage along with the internal storage and memory may form a storage system for storing and maintaining information (e.g., documents, presentations, etc). Such a system many communicate with the user and respective computing resource (e.g., a client device, terminal, etc) to provide documents and information for presentations, meetings, etc. The database 722 may include relational, object orientated, or other types of databases for storing information.

In other words, the processes, techniques, and the like, described herein (for both client devices and server or controller systems) may be implemented on a computing system. Such implementations may then configure or program the processing system to carry out aspects according to certain example embodiments. It will be appreciated that other types of architectures may be used. For example, the CPU 704 may include multiple "cores." In certain example embodiments, the display 718 may be paired with a touch panel to create a touch screen display device. Further, the various elements shown in connection with FIG. 7 may be included into one cohesive physical structure (e.g., such as a tablet device). For example, the display, user input, and processing system may be included in the same housing structure.

Figure 8:
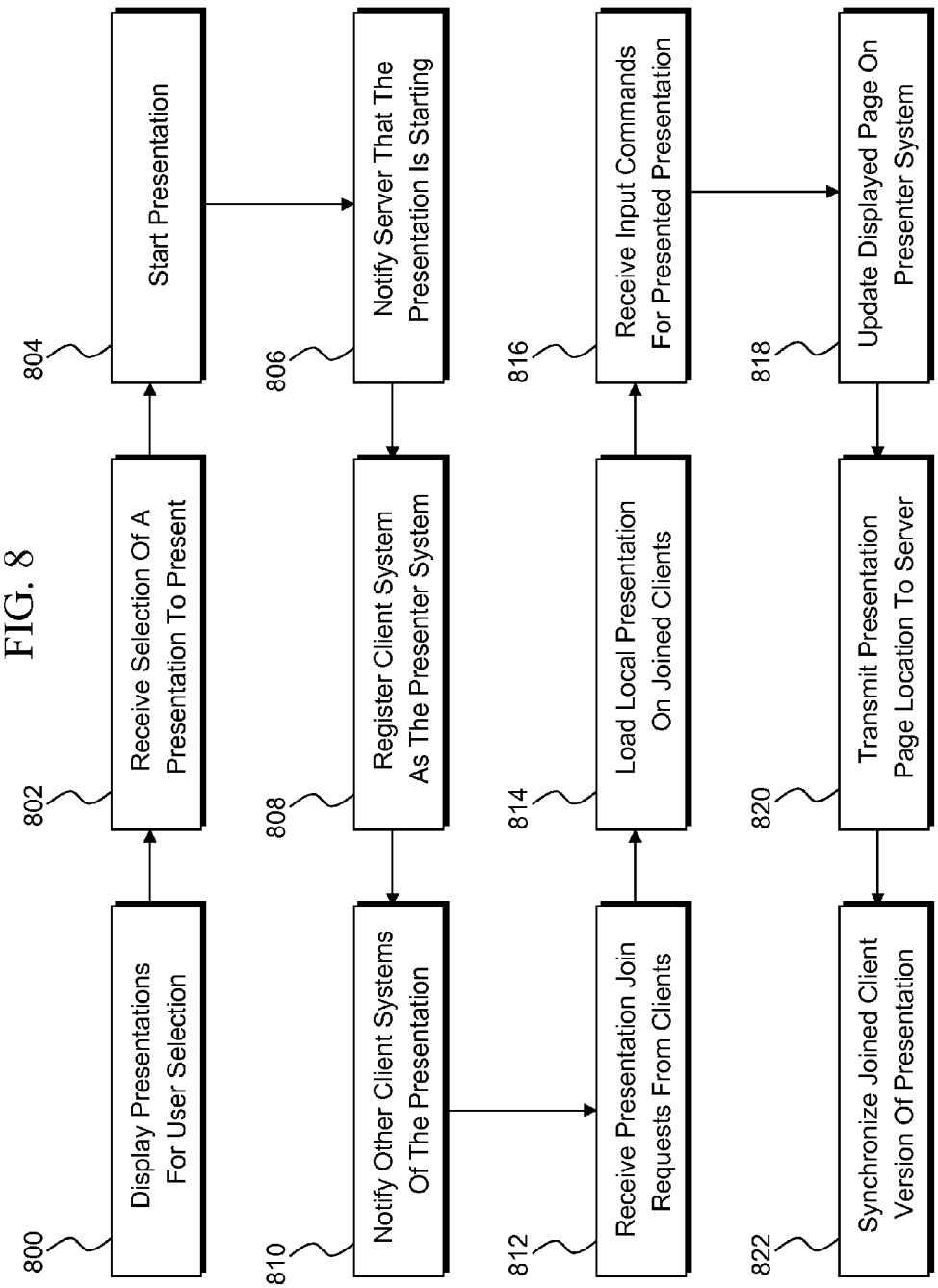
FIG. 8 is a flow chart showing a process of sharing of a presentation according to certain example embodiments.

FIG. 8 is a flow chart showing a process of sharing of a presentation according to certain example embodiments. In step 800, client devices may display a list of available presentations. The list may be generated based on the userID of the person using the client device.

In step 802, the user of the client device may select one of the presentations to present. The selected presentation may then be started in step 804. In certain instances, the presentation may be streamed or otherwise downloaded from a server to the client device to provide a personal or localized copy of the presentation.

In step 806, the server or presentation controller may be notified that this client device is starting a presentation. The presentation controller then registers the client as a presenter client device in step 808.

In step 810, other client device devices are notified or updated that the presenter client device is the presenter for the selected presentation.

In step 812, some of the other client devices may submit requests to join the initiated presentation. For example, these client devices may register with the controller presentation system to "follow" the presentation being given by the presenter client device. The controller presentation system then records or otherwise stores information from the joined or registered client devices. For example, an IP address or other information is stored. The joined client devices are now listener client devices.

In step 814, the listener client devices load local (or personal) copies or personalized versions of the selected presentation. As explained above, these copies may be stored on the mobile device or downloaded on demand.

In step 816, the presenter client device receives input commands that are associated with the user giving the presentation. For example, the presenter may instruct the presenter client device to display the next page of the presentation. Such commands may also include zooming into different locations of the presentation, scrolling to different tables, highlighting, or any commands that may visually alter the presentation as displayed on the presenter client device. In this example, the displayed page of the presentation on the presenter client device is updated at step 818 in accordance with the received input commands.

In step 820, the document location is transmitted to the presentation controller system. The presentation controller system then re-broadcasts the document location to all of the subscribed or joined listener client devices. Accordingly, the listener client devices are synchronized, in step 822, by receiving the document location and causing the local or personal version of the selected presentation to display in accordance with the received document location.

Figure 9:
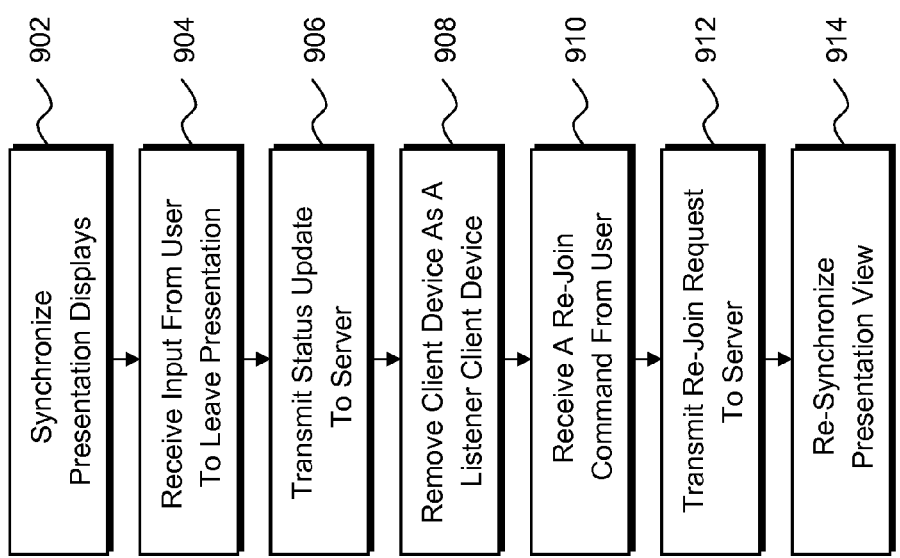
FIG. 9 is a flow chart showing a process of leaving a synchronized presentation.

FIG. 9 is a flow chart showing a process of leaving a synchronized presentation. As discussed above, the displays (or pages/document) between the presenter client device and the listener client device may be synchronized per step 902. However, in this instance the listener client device receives a command to leave or otherwise pause the presentation on the listener client device in step 904. In certain example embodiments, this command may be input from a user of the listener client device or may be received from another computing system (e.g., by a server).

In step 906, the pause command is transmitted from the listener client device to the server. The server then removes or indicates that this listener client device is no longer "active" for this presentation in step 908. In accordance with the status update, the server no longer relays document location updates that are transmitted from the presenter client device. As describe above, a user may then check their e-mail, navigating to other document/presentation portions, input annotations, or perform other tasks.

After being de-synchronized (e.g., to perform other tasks), the user initiates a rejoin command at step 910. Such a rejoin request is transmitted to the server in step 912 where the server records that the listener client device is active. In certain example embodiments, the server may immediately send the last known location/status of the presentation to the listener. In certain embodiments, the server may wait until a new update is received from the presenter client device before the newly reinstated listener client device is resynchronized in step 914.

In certain instances, the server may store all commands that have been received from the presenter client device. For example, such commands may be stored in a database or the like. Upon receipt of a reinstatement (or a join in progress) request, the server may send all (or a portion thereof) of the commands to the listener client device in order to replicate how the presentation has been presented. The listener client device then runs these commands without updating the display (e.g., only updating the "state" of the presentation on the listener client device) until the last command is run. After running the most recent command the local version of the presentation on the listener client device may be displayed to the user.

In certain example embodiments, such techniques may be used to implement "replay" ability so that completed presentations may be re-watched by users at a later date (e.g., if they were unable to initially attend the presentation). Specifically, as all of the commands given in the presentation are stored on the server, the presentation may be "broadcast" by the server for a second time without the need of a human providing the commands to carry out the presentation. In certain example embodiments, this information may be stored in conjunction with audio (e.g., from a microphone) obtained from the original presenter. These two streams of information (audio and presentation data) may be synchronized during the replay for listening users.

Returning briefly to FIG. 9, it will be appreciated that other techniques may be used to de-synchronize the listener client device from the presenter client device. For example, in certain example embodiments, the listener client device may continue to receive updates, but may simply not process the received document location information until the re-synchronization command is given.

Figure 10:
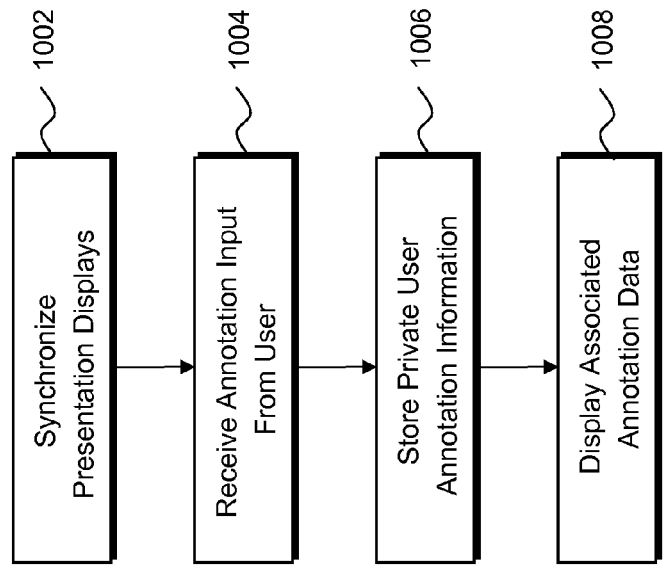
FIG. 10 is a flow chart showing association of annotation information with a presentation.

FIG. 10 is a flow chart showing association of annotation information with a presentation. As with FIG. 9, a synchronized state between the presentation client device and the listener client device is maintained in step 1002.

In step 1004, the user of the listener client device may provide annotation input to the system. For example, the user may highlight a portion of the document currently being displayed. In another example, a user may create a note (e.g., a sticky note) and associate it with a particular passage or portion of the presentation.

In any event, in step 1006, the annotation information is stored to be retrieved and displayed at a later date with the presentation. In certain example embodiments, the annotation information may be stored on the mobile listener client device. In certain example embodiments, the annotation information may be stored on a separate computing system (e.g., a server) and then streamed to the listener client device when it is to be displayed in step 1008.

In certain example embodiments, when displaying the annotation data in step 1008, the client device may integrate the annotation information with the local or personal version of the presentation on the fly. For example, the annotation data may include information that lines 5 through 10 of page 5 of the presentation are highlighted. Accordingly, when the presentation is to be displayed at page 5, the listener client device adjusts the display of the local version of the presentation such that lines 5 through 10 are highlighted.

Alternatively, the annotation information may be expressly stored with the local or personal version of the presentation, such that the locally stored copy is modified with the additional annotation data.

In certain example embodiments, a presentation or meeting book may have multiple presenters. For example, there may be two or more presenter devices that each supply updates to a server.

In certain example embodiments, the client device or user that is "leading" a presentation may switch in the middle of a presentation. For example, in a board meeting setting, a company report may be the subject of a meeting. The company report may have multiple sub-sections that respectively have different "owners." During the presentation for this report, a first user may start out as a leader of the presentation such that updates are provided from the first user's client device to the server. When a new section of the presentation is to be discussed that is the responsibility of another user, the leadership of the presentation may switch to a second user. Thus, the second user, who may have been a listener for the first part of the presentation, is now the leader for a second part of the presentation. Conversely, the first user may now be a listener for the second part of the presentation.

In certain example embodiments, passing leadership of a presentation between users may be a manual process that allows a user to select one of the listeners (or even a non-listening user—that is now required to join) to lead the presentation. Alternatively, leadership changes may be automatically carried out based on triggers within the presentation. For example, the first section may be associated with the first user and the second section may be associated with the second user. Upon transitioning from the first section to the second section, the respective users may be automatically notified of the change in who is leading the presentation. In any event, control of a presentation may be passed between users.

In certain example embodiments, ad-hoc input that is provided to a presenter client device may be mirrored or reflected on listener client devices. In one example, the presenter uses the touch screen in a manner similar to how a laser pointer would work with a projector. Specifically, the presenter provides touch input by moving his/her finger across the screen (e.g., to indicate a particular portion of the displayed presentation). This input may be recorded by noting the location on the screen and the time of the touch input. The recorded input may then be forwarded onto each of the listener client devices.

Once the input initially provided to the presenter device is received, a visual representation is output to the display. This representation may take the form of a red dot (e.g., a laser pointer) and track the input locations provided by the user of the presenter client device.

In certain instances, when the presenter initially provides the input no visual display of the input on the presenter's device is shown, instead only the input coordinates and timestamp information are recorded by the presenter client device. In other examples, a red dot is shown on the display of the presenter client device that tracks the movements provided by the presenter. In other examples, the input is shown as a continuous line that is drawn on the screen based on the provided input. Also, a continuous line may be displayed in lieu of the red dot on the listener client device.

Certain example embodiments may implement dynamic due diligence techniques in association with certain example embodiments. Such techniques may be described in U.S. application Ser. Nos. 13/543,564 and 13/543,617, the entire contents of which are hereby incorporated by reference. For example, the annotations provided by a user may be linked to a dynamic due diligence item for subsequent action thereon.

Further, other types of "ad-hoc" input that are provided to the presenter client device may be reflected on the listener client device. For example, highlighting, zooming in and out, scrolling, and the like may all be reflected on the listener client devices.

As described herein, the term "presentation" is intended to encompass meeting books, shared documents, or other collaborative viewings in which multiple users on multiple difference devices are presented with the same (or substantially similar) information. For example, reviewing accounts of a company's sales figures may be considered a presentation.

The description herein has been provided for purposes of explanation and non-limitation (e.g., specific details such as particular nodes, functional entities, techniques, protocols, standards, etc. in order to provide an understanding of the described technology). It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process can include, e.g., a processor and those input devices and output devices that are appropriate to perform the process.

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A mobile screen sharing presentation system, comprising:
    a plurality of client devices including a presenter client device and at least one mobile listener client device, each one of the plurality of client devices including a display and a processing system configured to output images to the display in accordance with a presentation document; and
    a presentation controller system configured to communicate with each one of the plurality of client devices via a computer network, the presentation controller system comprising at least one processor,
    wherein the processing system of the presenter client device is further configured to:
        output a presenter version of the presentation document to the display of the presenter client device in accordance with received presenter user input commands; and
        communicate a synchronization update status indicator to the presentation controller system, wherein the synchronization update status indicator is associated with how the presenter version is output on the display of the presenter client device and indicates a location within the presentation document currently displayed at the presenter client device, and wherein the synchronization update status indicator does not include images that correspond to a currently displayed view of the presentation document on the presenter client device,
    wherein the at least one processor of the presentation controller system is configured to:
        receive, from the presenter client device, the synchronization update status indicator; and
        transmit the synchronization update status indicator to the at least one mobile listener client system,
    wherein the processing system of the at least one mobile listener client device is further configured to:
        receive and load a local version of the presentation document;
        receive the synchronization update status indicator from the presentation controller system;
        load user-specific annotation data that is associated with the local version of the presentation document;
        output, to the display, the local version of the presentation document including the user specific annotation data, where the user specific annotation data is integrated into the local version of the presentation document; and
        maintain synchronization, in accordance with the synchronization update status indicator, between the output annotated local version of the presentation document and the output presenter version of the presentation document,
    wherein the user-specific annotation data of the at least one mobile listener client device is not displayed on other ones of the plurality of client devices, and
    wherein the presentation document includes at least one trigger within the document that indicates when an automatic switch to a new presenter is to be triggered, and, in response to the trigger, at least one of the mobile listener client devices is configured to automatically assume a presenter role during presentation of the presentation document and the presenter client device is configured to automatically assume a listener role during presentation of the presentation document.

2. The system of claim 1, wherein the synchronization update status indicator further indicates one of: a line number for a line within the presentation document currently displayed at the presenter client device; or a zoom percentage currently used for displaying the presentation document at the presenter client device.

3. The system of claim 1, wherein the processing system of the at least one mobile listener client device is further configured to:
    accept user input from a user while the presentation document is being displayed to the user; and
    store the accepted user input as the user-specific annotation data in association with the local version of the presentation document.

4. The system of claim 1, wherein the at least one mobile listener client device is further configured to, responsive to user input commands on the at least one mobile listener client device, desynchronize the displayed view of the presentation document with the presenter client device; and
    after desynchronizing, resynchronize with the presenter client device for the presentation document.

5. The system of claim 1, wherein the processing system of the presentation controller system is further configured to:
    receive a notification from the presenter client device that the presentation document is ready for presenting;
    notify a plurality of client devices that the presentation document is ready for presenting; and
    receive join requests from the at least one mobile listener client device, the at least one mobile listener client device included in the plurality of client devices.

6. The system of claim 1, wherein:
    the processing system of the presenter client device is further configured to:
        receive ad-hoc user input while the presenter version is output to the display of the presenter client device;
        transmit presenter ad-hoc data in accordance with the receive ad-hoc user input; and
    the processing system of the at least one mobile listener client device is further configured to:
        receive the presenter ad-hoc data; and
        output graphical images to the display based on the received presenter ad-hoc data.

7. A method of synchronizing a presentation of a presentation document on a plurality of mobile listener client systems where a presenter client system leads the presentation and the plurality of mobile listener client systems follow the presentation being led by the presenter client system, the method comprising:
- receiving a communication that the presenter client system is the leader of the presentation;
- recording that the presentation is available to be joined;
- receiving join requests from the plurality of mobile listener client systems to follow the presentation;
- storing identification information, to a non-transitory storage medium system, that identifies the plurality of mobile listener client system joined to the presentation, each one of the plurality of mobile listener client systems set to load a local version of the presentation for display thereon;
- receiving a synchronization update indication from the presenter client system that relates to a displayed view of the presentation document on the presenter client system and indicates that a location within the presentation document displayed in the displayed view has changed, and wherein the synchronization update indication does not include images that correspond to a currently displayed view of the presentation document on the presenter client system;
- transmitting the synchronization update indication to each one of the plurality of mobile listener client systems based on the stored identification information, each one of the plurality of mobile listener client systems set to update respective local displayed views of local versions of the presentation document in accordance with the transmitted synchronization update indication;
- transmitting, from a first one of the plurality of mobile listener client systems, a desynchronization command;
- causing transmitted synchronization update indications to not be transmitted to the first one of the plurality of mobile listener client systems as a result of receiving and processing the desynchronization command;
- after processing of the de-synchronization command, transmitting, from the first one of the plurality of mobile listener client systems, a rejoin command; and
- causing the first one of the plurality of mobile listener client systems to be resynchronized with the presenter client system as a result of receiving and processing the rejoin command,
- wherein the local display views of the local version of the presentation document include personal annotation information specific to at least one mobile listener client system of the plurality of mobile listener client systems or a user thereof, where the personal annotation information of a first client system of the plurality of mobile listener client systems is not displayed on other ones of the plurality of mobile listener client systems, where the personal annotation information of the first client system is integrated into the local display view of the local version of the presentation document, and
- wherein the presentation document includes at least one trigger within the document that indicates when an automatic switch to a new presenter is to be triggered, and, in response to the trigger, at least one of the mobile listener client systems is configured to automatically assume a presenter role during presentation of the presentation document and the presenter client system is configured to automatically assume a listener role during presentation of the presentation document.

8. The method of claim 7, wherein the synchronization update indication is a line number.

9. A non-transitory computer readable storage medium having stored thereon computer readable instructions for use with a mobile presentation computing system, the mobile presentation computing system including a processing system that includes: at least one processor and a transceiver, wherein the stored computer readable instructions comprise instructions that, when executed by the at least one processor, cause the mobile presentation computing system to perform a process that includes:
- transmitting a request, via the transceiver, to join as a follower of a presentation of a presentation document, wherein the presentation is led on a presenter client system, and
  wherein a presenter version of the presentation document is stored at the presenter client system and a view of the presenter version is displayed at the presenter client system;
- loading a personal version of the presentation document, wherein the personal version of the presentation document is stored locally at the mobile presentation computing system;
- outputting, to a display device that is associated with the mobile presentation computing system, a view of the personal version of the presentation document;
- receiving, via the transceiver, presentation synchronization information,
  wherein the presentation synchronization information is usable to synchronize the view of the personal version of the presentation document as displayed at the mobile presentation computing system and the view of the presenter version of the presentation document as displayed at the presenter client system, and
  wherein the presentation synchronization information indicates a current page of the presentation document being displayed in the view of the presenter version at the presenter client system, and wherein the presentation synchronization information does not include images that correspond to a currently displayed view of the presentation document on the presenter client system;
- maintaining synchronization, in accordance with the presentation synchronization information, between the view of the personal version of the presentation document as displayed at the mobile presentation computing system and the view of the presenter version of the presentation document as displayed at the presenter client system;
- de-synchronizing, in response to user input provided on the mobile presentation computing system, the views of the personal version and the presenter version;
- while de-synchronized, receiving user-specific annotation input that is incorporated into the personal version of the presentation document and saving the user-specific annotation input;
- resynchronizing, in response to user input provided on the mobile presentation computing system, the views of the personal version and the presenter version; and
- outputting, to the display device, the user-specific annotation data, where the user-specific annotation data is integrated into the personal version of the presentation document that correspondingly displayed on the display device and the user-specific annotation data is also not displayed on other computing systems that are following the presentation,
- wherein the presentation document includes at least one trigger within the document that indicates when an automatic switch to a new presenter is to be triggered, and, in response to the trigger, the mobile presentation computing system is configured to automatically assume a presenter role during presentation of the presentation document and the presenter client system is configured to automatically assume a listener role during presentation of the presentation document.

10. The non-transitory computer readable storage medium of claim 9, wherein the presentation synchronization further indicates: a line number for a line within the presentation document; or a zoom percentage currently used for displaying the presentation document.

11. The non-transitory computer readable storage medium of claim 9, where the process further includes:
receiving user input from a user of the mobile presentation computing system while the local version of the presentation document is being displayed and synchronized with the presenter version; and
storing the user-specific annotation in association with the personal version of the presentation document.

12. The non-transitory computer readable storage medium of claim 9, where the process further includes:
receiving presenter ad-hoc data that is based on input provided by a presenter to the presenter client system; and
outputting graphical images to the display device based on the received presenter ad-hoc data.

13. The non-transitory computer readable storage medium of claim 9, wherein the process further includes:
receiving presentation leader input from a user of the mobile presentation computing system indicating that the user is to lead the presentation; and
transmitting data, via the transceiver, indicating that the mobile presentation computing system is to lead the presentation.

14. A computing device, comprising:
a transceiver that is configured to receive information regarding a presentation of a presentation document, wherein the presentation is led at a presenter computing device, and
wherein the presenter computing device is configured to store a presenter version of the presentation document;
a non-transitory storage medium that is configured to store a personal version of the presentation document, wherein the personal version of the presentation document is personal to a user of the computing device;
a display that is configured to show a display view of the personal version of the presentation document;
a user input device that is configured to receive input from the user of the computing device; and
a processing system that includes at least one processor, the processing system configured to:
receive, via the user input device, user input to follow the presentation as led from the presenter computing device;
receive, via the transceiver, data that is associated with how the presentation document is displayed on the presenter computing device, wherein the received data indicates a location within the presentation document being displayed on the presenter computing device, and wherein the received data does not include images that correspond to a currently displayed view of the presentation document on the presenter computing device;

update, via the display, the display view to a new display view of the personal version of the presentation document in accordance with the received data;
load user-specific annotation data that is associated with the personal version of the presentation, wherein the display view and the new display view include the user-specific annotation data integrated into where the personal version of the presentation is displayed, wherein the user-specific annotation data is not provided to other computing devices for display thereon;
transmit a de-synchronization command that causes another computer system to suspend transmission of the data that indicates the location within the presentation document being displayed on the presenter computing device; and
transmit after transmission of the de-synchronization command, a rejoin command that causes the another computer system to resume transmission of the data that indicates the location within the presentation document being displayed on the presenter computing device,
wherein the presentation document includes at least one trigger within the document that indicates when an automatic switch to a new presenter is to be triggered, and, in response to the trigger, the processing system is configured to automatically assume a presenter role during presentation of the presentation document and the presenter computing device is configured to automatically assume a listener role during presentation of the presentation document.

15. The computing device of claim 14, wherein the processing system is further configured to:
receive, via the user input device, user input as the user-specific annotation data; and
store, to the non-transitory storage medium, the user-specific annotation data as associated with the personal version of the presentation.

16. The computing device of claim 14, wherein the location within the presentation document being displayed on the presenter computing device as indicated in the received data is: a page number for a page within the presentation document; or a slide number for a slide within the presentation document.

17. A presentation computing device, comprising:
a user input device configured to receive input from a presenting user;
a display configured to display a presenter version of a presentation document, wherein the presenter version is stored at the presentation computing device; and
a processing system that includes at least one processor, the processing system configured to:
load the presenter version of the presentation document;
output the presenter version of the presentation document to the display in accordance with user input commands received via the user input device;
transmit, via a computer network, a synchronization update status indicator that indicates a location within the presentation document that is output to the display, wherein the synchronization update status indicator does not include images that correspond to a currently displayed view of the presentation document on the presentation computing device; and
as a result of processing a presentation leadership trigger within the presentation document indicating that an automatic switch to a new presenter is to be triggered, automatically cause leadership of the presentation to be passed to another computing device or user associated with the another computing device during presentation of the presentation document and automatically cause the presentation computing device or presenting user to assume a listener role during presentation of the presentation document, wherein the synchronization update status indicator is set to be received by a listener client device that is configured to display a listener version of the presentation document that is stored locally at the listener client device, wherein the listener version of the presentation document includes personal annotation data that creates a personalized annotated version of the presentation document that is displayed with the personal annotation data integrated therein, where the personal annotation data is not displayed on other client devices that are synchronized with to the presentation, and wherein synchronization of the displayed annotated listener version and the output presenter version is maintained in accordance with the synchronization update status indicator.

18. The presentation computing device of claim 17, wherein the transmitted synchronization update status indicator further indicates one of: a page number; a slide number; a line number; or a zoom percentage.

* * * * *